July 29, 1947.  I. O. MINER  2,424,766
TELEMETRIC APPARATUS
Filed June 19, 1944   2 Sheets-Sheet 1

INVENTOR
IRVING O. MINER
BY E.C. Sanborn
ATTORNEY

July 29, 1947.  I. O. MINER  2,424,766

TELEMETRIC APPARATUS

Filed June 19, 1944  2 Sheets-Sheet 2

INVENTOR
*IRVING O. MINER*
BY E.C. Sanborn
ATTORNEY

UNITED STATES PATENT OFFICE 2,424,766

TELEMETRIC APPARATUS

Irving O. Miner, East Providence, R. I., assignor to Builders Iron Foundry, Providence, R. I., a corporation of Rhode Island Application June 19, 1944, Serial No. 540,978

7 Claims. (Cl. 171—119)

This invention relates to the telemetering of variations in value of a variable magnitude. An object is the provision of a novel and effective telemetering system involving relatively few parts, simple and inexpensive in construction, and highly reliable in operation.

The invention also provides a novel and advantageous transmitter adapted for use in such a system.

Other features and advantages of the invention will be hereinafter described and claimed.

In the accompanying drawings:

Figs. 1, 2, 3, and 4 are wiring diagrams illustrating different embodiments of my telemetric system.

Figure 1:
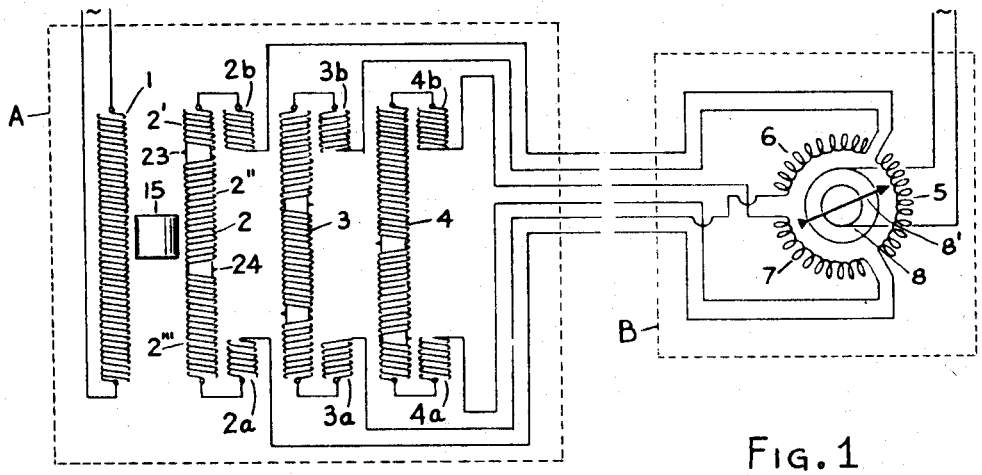

Referring to Fig. 1, the transmitter A comprises a primary winding 1 and three secondary windings 2, 3, and 4. The primary winding is connected to a suitable source of alternating current.

Each of the secondary windings is electrically connected, as shown, to a corresponding one of a plurality of secondary windings 5, 6, and 7 of a receiver B. The latter includes an armature 8 rotatable within the magnetic field of the windings 5, 6, and 7, said armature comprising a winding connected either to the same current source as that to which the transmitter winding 1 is connected, or to another alternating current source of the same frequency. The receiver is of known type and no novelty is claimed for said receiver per se.

Figures 5, 6, 7:
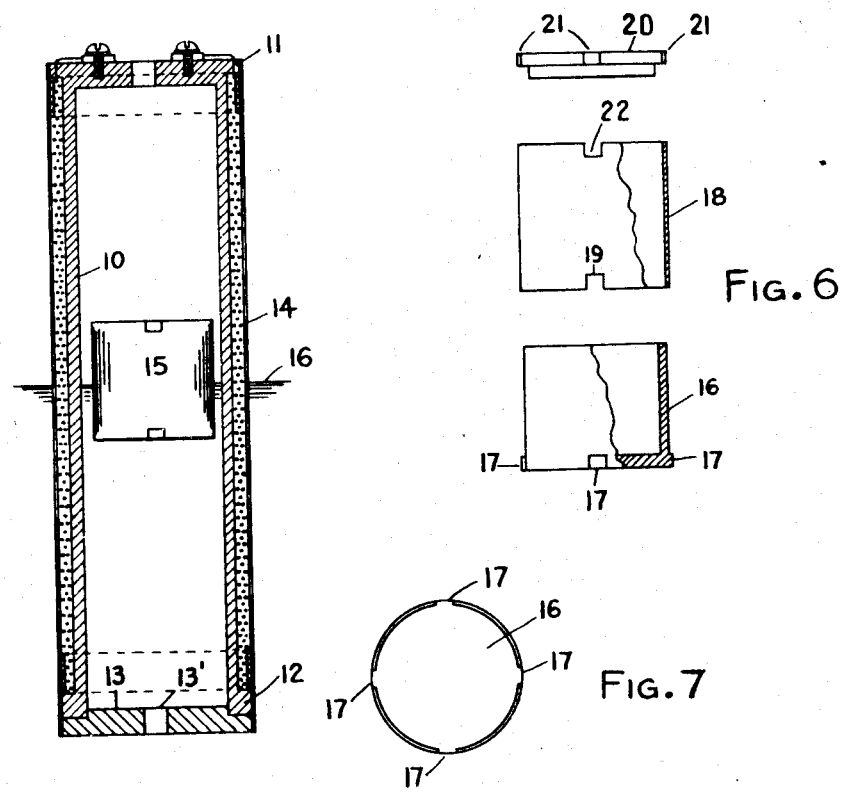
Fig. 5 is a view in vertical section of a telemetric transmitter embodying my invention.
Figs. 6 and 7 are views of details of the transmitter.

The transmitter is shown in Fig. 5 as comprising a cylindrical body portion 10 of any suitable material which is non-magnetic and electrically non-conductive. Bakelite or other plastic material may, for example, be employed. Upper and lower circumferential flanges 11, 12 may be provided, projecting outwardly from said body portion 10. Fitted within the lower end of said body portion is a suitable plug 13 of the same material as said body portion. The top end of the body portion 10 may comprise a similar plug or may be formed as an integral part of the body portion, as shown.

Pressed firmly against the upper and lower flanges 11, 12, and surrounding said body portion 10 throughout its entire length is a metallic sleeve 14. Said sleeve is of electro-magnet steel, or any other suitable material of high magnetic permeability, high electrical resistance, and low eddy-current and hysteresis losses. Silicon steel is well known as a material having those properties.

Within the space between the sleeve 14 and body portion 10 are the primary and secondary windings of the transmitter, each of said windings being, of course, suitably insulated from the other. Preferably the secondary windings are located nearest the shell 14, while the primary winding is positioned between said secondary windings and the body portion 10.

Within the interior of the body portion 10 is an element 15, which is movable to positions corresponding to variations in value of a variable magnitude, such as pressure, temperature, liquid level, rate of flow, or the like. In the present embodiment the element 15 is shown as a float movable with variations in level of a liquid 16, in which the transmitter casing is placed and which may enter the interior of the body portion 10 through an opening 13' in the plug 13. The liquid may, for example, be that in any storage tank, or it may be a liquid in a fluid-pressure manometer, in which case the variations in level correspond to variations in a fluid pressure to be measured.

Of course, the element 15 need not be a float, but may simply be an element connected to anything which moves it inside the windings to positions corresponding to values of any variable magnitude. For example, said element might be connected to the stem of a gate valve to telemeter the position of the gate to show at a distant point the extent to which the gate is open.

As shown in Figs. 6 and 7, the element 15 may comprise a tubular shell 16 closed at one end and formed of a plastic or other suitable non-magnetic and non-conducting material. The lower end of said shell has lugs 17 projecting outwardly therefrom.

Surrounding the shell 16 is a sleeve 18 of electro-magnet steel. Said sleeve has notches, such as indicated at 19, in its lower end for fitting over the lugs 17 on the shell 16. The sleeve 18 extends upwardly beyond the shell 16 and receives in its upper end a suitable cap or closure 20 of material of the same type as that of said shell 16. Said cap 20 includes an upper outwardly projecting flange adapted to fit within the top edge of the sleeve 18 and having thereon outwardly extending lugs 21 which fit into corresponding notches in said sleeve.

The length of the space within the transmitter body portion 10 is sufficient to extend from the highest to the lowest elevation of liquid level to be transmitted, plus the length of the float 15.

In operation, the float 15 is positioned within the transmitter by the height of the liquid 16. Current in the primary winding produces a magnetic field, which in turn induces currents in each of the secondary windings of the transmitter, under the influence of the float 15. The concentration of flux produced by the primary winding in the region near the float sleeve 18 is greater than at other parts of the transmitter; and the portions of the secondary windings through which this flux concentration passes depend upon the position of said float. In other words, the float directs magnetic flux derived from the primary winding upon different portions of the secondary windings, determined by the elevation of the float and thus by the level of the liquid 16. For each position of the float the combination of voltages induced in the secondary windings is different from the voltage combinations induced in said windings in all other positions of said float. These voltages are impressed upon the coils of the receiver and produce a magnetic field having a definite angular position for each position of the float. The receiver armature 8 assumes the angular position of said field and indicates its direction and therefore the float position. Said armature may carry any suitable recorder or indicator, such as a pointer 8'.

The production of the desired changes in voltage may be obtained by providing each secondary coil with oppositely wound portions interconnected at points displaced with respect to corresponding points on the other secondary coils. For example, the coil 2 is shown comprising portions 2' and 2''', wound oppositely to portion 2'', said portions being connected at points 23, 24, which may be termed "reversal points." Likewise, coils 3 and 4 are each shown as comprising oppositely wound portions interconnected at certain reversal points. The reversal points of each coil are displaced with respect to those of the other coils.

It will be seen that the voltage induced in each secondary coil by the flux applied through the float 15 varies from zero (when the float is opposite a reversal point in the coil) to plus or minus a maximum (when the float is opposite a point midway between two reversal points). By displacing the reversal points of each coil with respect to those of the others, different voltages are produced in said coils, and hence in the receiver coils, so that said receiver coils produce a magnetic field having a definite angular position for each position of the float.

In any case the voltage produced in any one secondary coil is $$E.\ M.\ F. = K \times \phi f N\ 10^{-8}$$

where $f$ = frequency of alternations (a constant for any one installation)

$N$ = number of secondary turns cut by the flux. When the acting part of a secondary coil has oppositely wound portions, N is the algebraic number of turns cut by the flux (i. e., the number of turns in one direction cut by said flux less the number of turns in the opposite direction concurrently cut by said flux).

$\phi$ = number of magnetic lines of force that cut turns = total useful flux $K$ = a constant depending on wave form (4.44 for a sine wave)

Figure 2:
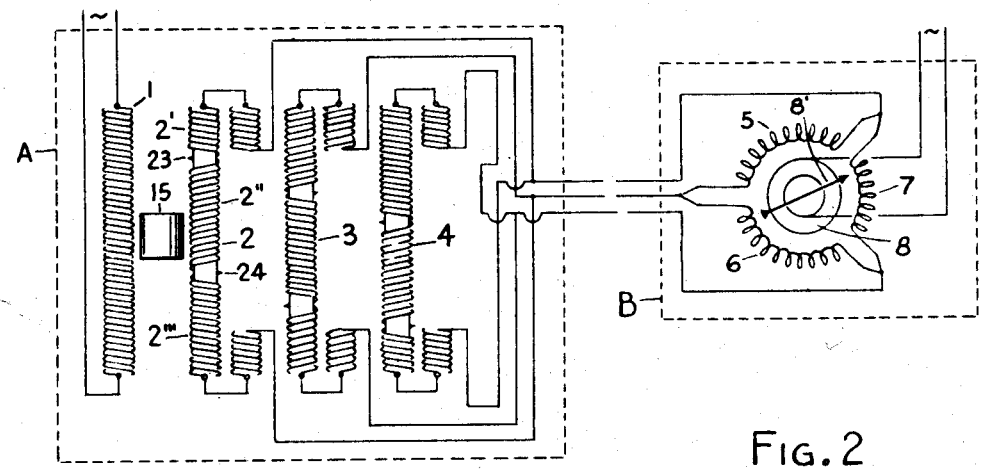

In Fig. 2 I have shown the same transmitter and receiver as in Fig. 1, but the connections of the secondary circuits are such that three wires suffice for transmission.

In cases where the full extent of travel of the float is utilized for the transmission of liquid level values, it is advantageous to provide each of the transmitter secondary coils with additional short coils adjacent each end, such as shown at 2a, and 2b in connection with coil 2, 3a and 3b in connection with coil 3, and 4a and 4b in conjunction with coil 4. When the float is moved to either end of the transmitter tube 18, some of the flux passes through the air beyond the secondary coils, so that less flux passes therethrough than when the float is in intermediate positions. The extra turns 2a, 2b, etc., take the place of turns which are missing beyond the ends of the physical length of the secondary coils, and through them full voltage is maintained in said secondaries, even when the float is at either end of its travel.

In lieu of said additional short coils, the turns at the ends of the secondary coils may be more closely spaced than in the intermediate portions of said secondaries.

Figure 3:
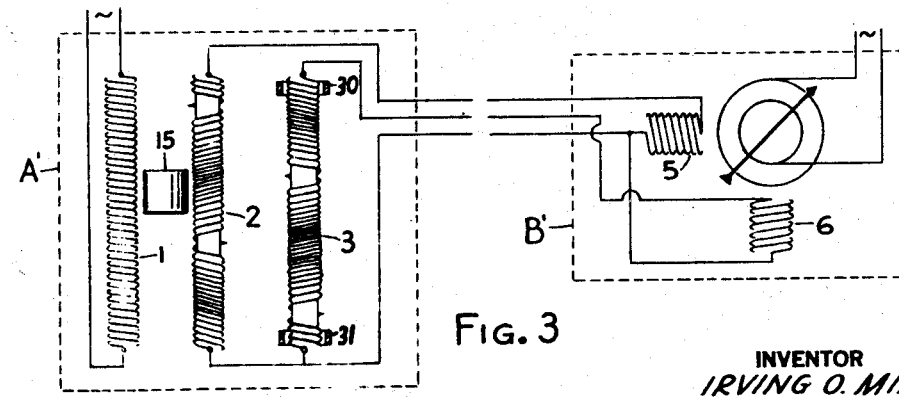

In Fig. 3 I have shown a transmitter A' and receiver B' of two-phase type. The transmitter has only two secondary coils 2 and 3, connected electrically to two secondary coils 5 and 6 in the receiver B'. In addition to having oppositely wound portions, each secondary coil of the transmitter has varying spacing of its turns in said portions. Said turns are shown as progressively varying in number per unit length of each coil portion from each reversal point. Through this variation in turn spacing there is obtained in each secondary coil a voltage having a sine relation to the float positions; i. e., a voltage which follows a sine curve with varying positions of the float.

Also, in Fig. 3, solid bands 30 and 31 of copper or similar material are applied to opposite ends of one of the transmitter windings. They may be positioned at opposite ends of the primary coil, if desired, though I prefer positioning them at each end of the transmitter between the secondary windings and the sleeve 14. I have accordingly shown them diagrammatically in Fig. 3 as surrounding the opposite ends of the secondary winding 3, assuming the latter to surround the windings 1 and 2. These bands are found advantageous in insuring stability of phase relation when the float is positioned near either end of the transmitter. When the full length of travel of the float is to be utilized, said bands insure that the alternations from the transmitter to the stator winding of the receiver are in phase with the alternations in the rotor winding of the receiver, just as they are without compensation when the float is between the ends of the transmitter. Copper bands, each about one inch wide, have been found suitable when the total length of the primary winding is about two feet.

Figure 4:
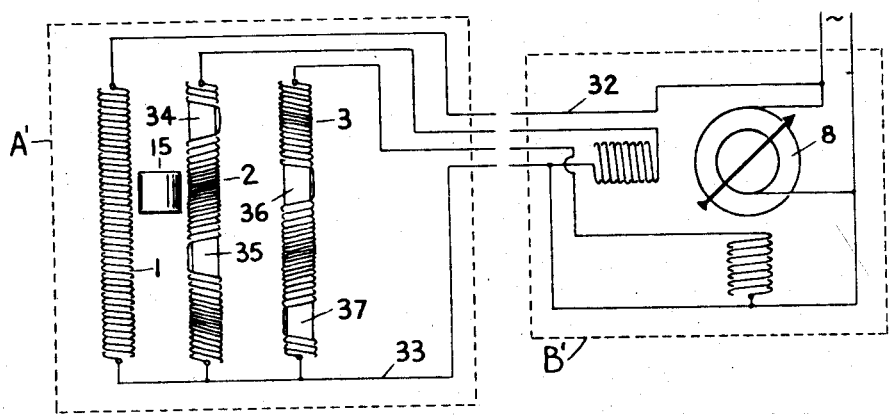

In Fig. 4 I have shown another embodiment, employing a two-phase transmitter and receiver. In this embodiment, the primary coil 1 of the transmitter A' is energized from the receiver over an extra wire 32 and the common secondary wire 33. Also, the secondary windings of the transmitter have spaces 34, 35, 36, and 37 approximately equal to the length of the float at the reversal points.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A telemetric transmitter comprising a primary winding, a plurality of secondary windings each comprising portions wound in opposite directions and each having its points of reversal displaced with respect to those of the other, a shell of material substantially permeable to magnetic flux surrounding said primary and secondary windings, and an element of material substantially permeable to magnetic flux surrounded by said windings and movable in response to variations in a variable magnitude for directing flux from said primary winding to portions of said secondary windings.

2. A liquid level transmitter comprising a primary winding, a plurality of secondary windings each comprising portions wound in opposite directions and each having its points of reversal displaced with respect to those of the other, a shell of material substantially permeable to magnetic flux surrounding said primary winding and a hollow float body movable within said secondary windings in response to changes of liquid level, said float body comprising material substantially permeable to the passage of magnetic flux for directing said flux to different portions of said secondary windings in accordance with different positions of said float.

3. A telemetric transmitter comprising a primary winding, a plurality of secondary windings, and means responsive to variations in a variable magnitude for correspondingly varying the transmission of flux from said primary winding to said secondary windings, and metallic bands adjacent opposite ends of certain of said windings.

4. A telemetric transmitter comprising a primary winding, a plurality of secondary windings, and an element movable in response to variations in a variable magnitude for directing flux from said primary winding to different portions of said secondary windings, and bands of non-magnetic metal adjacent opposite ends of certain of said windings.

5. A telemetric transmitter comprising a primary winding, a plurality of secondary windings each having a different number of turns per unit length in one portion than in another portion, and an element movable in response to variations in a variable magnitude for directing flux from said primary winding to different portions of said secondary windings.

6. A telemetric transmitter comprising a primary winding, a plurality of secondary windings each comprising portions wound in opposite directions and each having its points of reversal displaced with respect to those of the other, and an element movable in response to variations in a variable magnitude for directing flux from said primary windings to portions of said secondary windings, each of said secondary windings having its turns variably spaced.

7. A telemetric transmitter comprising a primary winding, a plurality of secondary windings each comprising portions wound in opposite directions and each having its points of reversal displaced with respect to those of the other, and an element movable in response to variations in a variable magnitude for directing flux from said primary windings to portions of said secondary windings, the oppositely wound portions being spaced from each other by a distance approximately equal to the length of said element.

IRVING O. MINER.

REFERENCES CITED

The following references are of record in the file of this patent:

UNITED STATES PATENTS

| Number | Name | Date |
| --- | --- | --- |
| 2,354,365 | Crossley | July 25, 1944 |
| 2,310,955 | Hornfeck | Feb. 16, 1943 |
| 2,050,446 | Meyer | Aug. 11, 1936 |
| 2,050,629 | Quereau | Aug. 11, 1936 |
| 2,357,745 | Kliever | Sept. 5, 1944 |

FOREIGN PATENTS

| Number | Country | Date |
| --- | --- | --- |
| 555,042 | Germany | July 19, 1932 |
| 692,455 | Germany | June 20, 1940 |